UNITED STATES PATENT OFFICE.

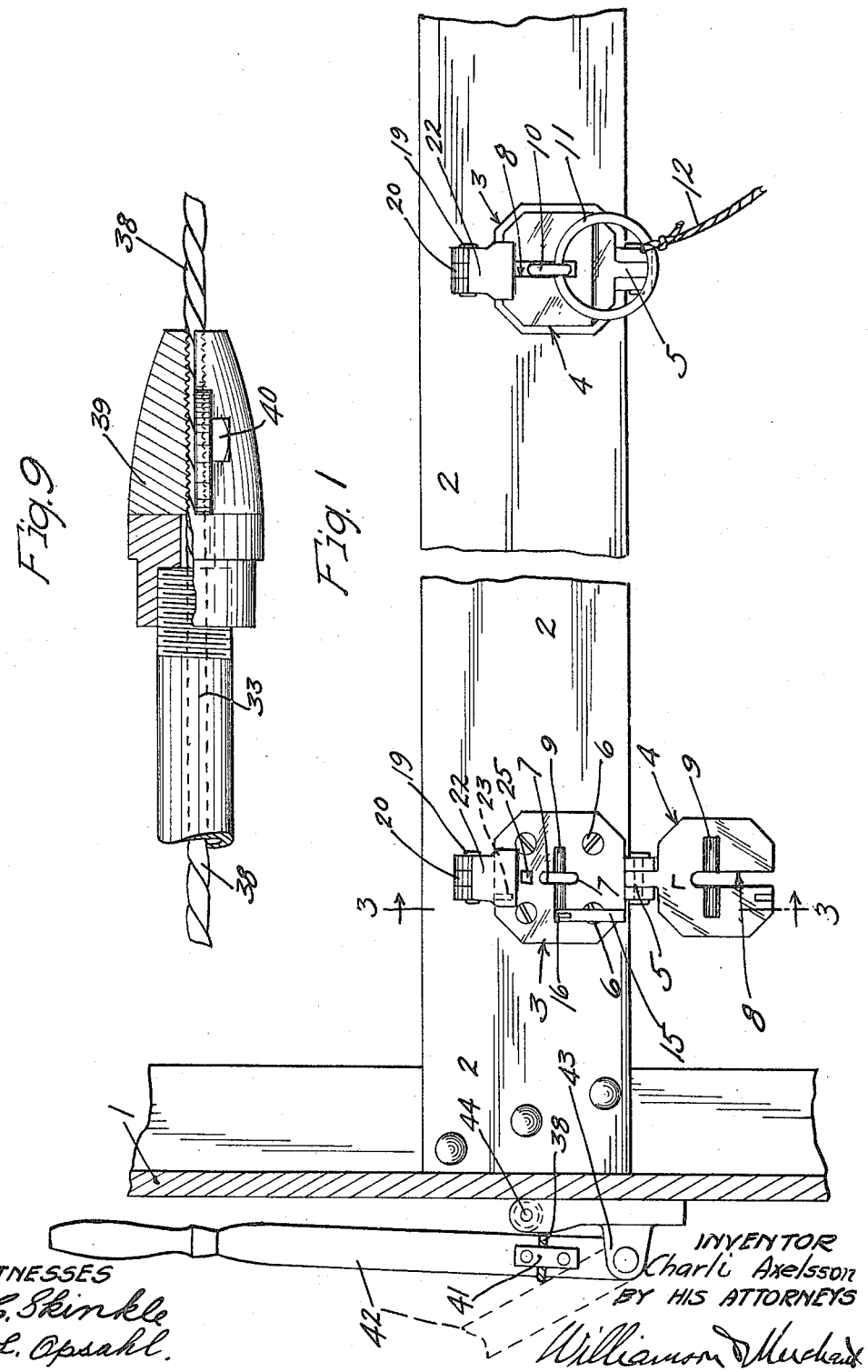

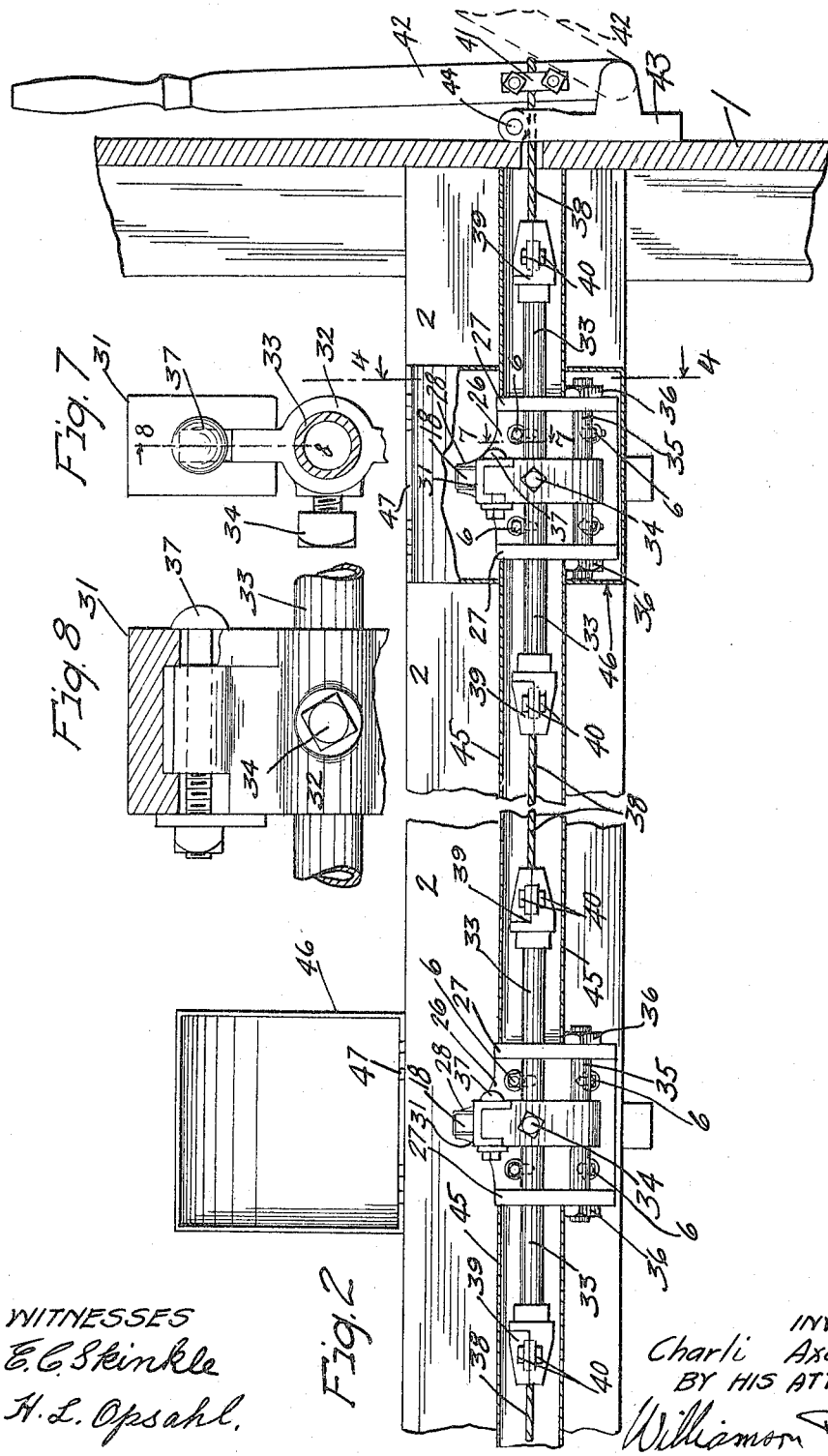

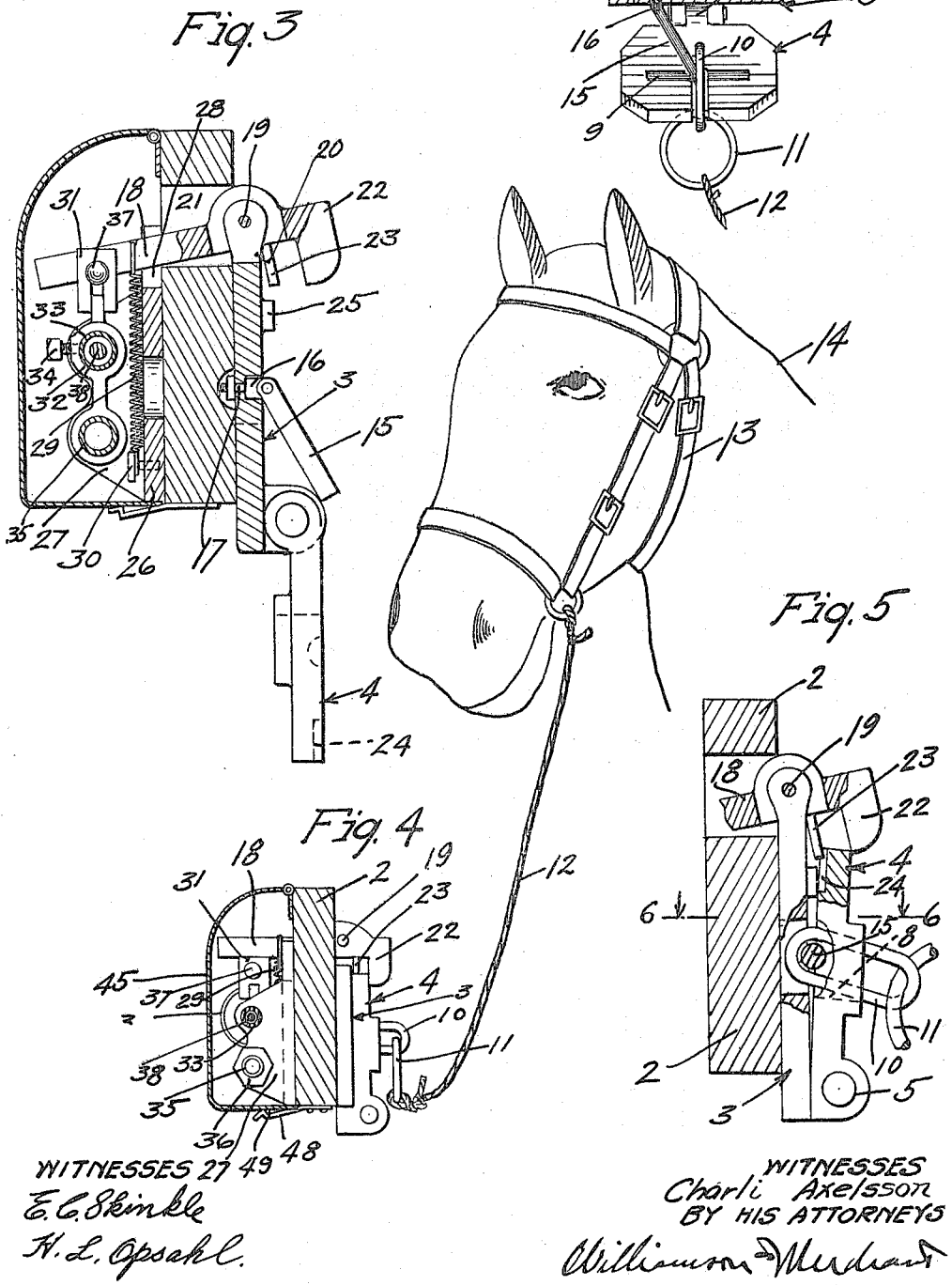

CHARLI AXELSSON, OF LAKEVILLE, MINNESOTA, ASSIGNOR OF THIRTY-FIVE ONE-HUNDREDTHS TO WILLIAM F. PREHALL, OF LAKEVILLE, MINNESOTA.

RELEASING DEVICE.

1,221,651.  Specification of Letters Patent.  Patented Apr. 3, 1917.

Application filed March 4, 1916. Serial No. 82,104.

*To all whom it may concern:*

Be it known that I, CHARLI AXELSSON, a citizen of the United States, residing at Lakeville, in the county of Dakota and State of Minnesota, have invented certain new and useful Improvements in Releasing Devices; and I do hereby declare the following to be a full, clear, and exact description of the invention, such as will enable others skilled in the art to which it appertains to make and use the same.

My invention has for its object to provide an efficient device for releasing horses and other animals from burning buildings; and, to this end, it consists of the novel devices and combinations of devices, hereinafter described and defined in the claims.

In the accompanying drawings, which illustrate the invention, like characters indicate like parts throughout the several views.

Referring to the drawings:—

Figure 1 is a fragmentary view, partly in front elevation and partly in vertical section, illustrating two units of the invention, one of the locks being open and the other closed;

Fig. 2 is a rear view of the parts shown in Fig. 1;

Fig. 3 is a transverse section taken on the line 3—3 of Fig. 1, on an elongated scale;

Fig. 4 is a transverse section taken on the line 4—4 of Fig. 2;

Fig. 5 is a fragmentary view of certain parts illustrated in Fig. 2 and showing the initial opening movement of the lock;

Fig. 6 is a horizontal section taken on the line 6—6 of Fig. 5 with the movable lock plate shown, still farther open;

Fig. 7 is a detail view, some parts being sectioned on the line 7—7 of Fig. 2 on an enlarged scale;

Fig. 8 is a view principally in elevation of the elements shown in Fig. 7, some parts being sectioned on the line 8—8 of Fig. 7; and Fig. 9 is a fragmentary view, partly in elevation and partly in section of a portion of the lock releasing device.

The numeral 1 indicates one wall of a barn structure and the numeral 2 indicates the front top board of the manger. For each stall in the barn structure, is a releasing device and, as these releasing devices are identical, one with the other, the description of the one will suffice for the other.

The numerals 3 and 4 indicate, respectively, a fixed lock plate and a movable lock plate, the latter of which is connected to the lower edge of the former by a hinge joint 5, for vertical swinging movement into flat engagement therewith. The fixed lock plate 3 is rigidly secured to the outer face of the manger board 2, preferably at a central point between the side walls of the respective stalls, by nut-equipped bolts 6, having their heads counter-sunk in said lock plate.

Formed in the fixed lock plate 3 is a vertically elongated aperture 7, which is located at the center of the flat dimension of said lock plate. In the movable lock plate 4 is a slot 8, which extends from the free edge thereof, and when said lock plate is closed, the lower extremity of its slot is coincident with the aperture 7. An elongated pin seat 9 is formed, one-half in the inner face of the plate 3 and the other half in the lock plate 4. This pin seat 9 extends transversely through the aperture 7 and slot 8, and is located at a point centrally between the ends of the aperture 7, when the lock plate 4 is closed.

A link 10 is secured, by a ring 11 to the free end of the tie rope 12 of a halter 13 on a horse 14. The link 10 is adapted to be inserted endwise through the slot 8 and into the aperture 7. The link 10 is detachably secured to the releasing device by a lock pin 15, adapted to be passed through the link 10, held in the seat 9, by the coöperating plates 3 and 4.

The lock pin 15 is provided with a pivoted head 16 swiveled at 17 to the fixed lock plate 3. The link 10 may be in the form of a ring or other loop, and the term herein used is intended to cover broadly all such modifications. The ring 11 affords a shoulder for the link 10 and is engaged by the movable lock plate 4, during its opening movement, to insure the positive disengagement of the link 10 from the pin 15.

The movable lock plate 4 is held closed by a lever 18, intermediately fulcrumed at 19 to an upwardly projecting bearing lug 20, integrally formed with the upper edge of the fixed lock plate 3. This lever 18 extends horizontally through an aperture 21 in the manger board 2 and is provided, at its front end, with a depending lock lug 22, arranged to overlap and engage the upper edge portion of the movable lock plate 4 for holding the same folded into flap engagement with the fixed lock plate 3.

Extending parallel to the lock lug 22, and spaced inward therefrom, is a depending kicker pin 23, arranged to engage the inner face of the lock plate 4, during the releasing movement of the lever 18, and impart the initial opening movement to the lock plate 4. The lock plate 4 is recessed at 24 to receive the kicker pin 23 and allow said lock plate 4 to fold into flap engagement with the lock plate 3. On the movable plate 4 is a centering lug 25, arranged to enter the slot 8, engage the sides thereof to thereby hold said lock plate 4 againt edgewise movement.

A bracket 26 is rigidly secured to the inner face of the manger board 2 by the slot 6 and has integrally formed, on its outer face, a pair of horizontally spaced bearing lugs 27 and on its upper edge, a pair of horizontally spaced guide lugs 28. The inner end of the lever 18 works between the lugs 28 and is held thereby against horizontal movement. The apertures in the bracket 26, through which the bolt 6 projects, are vertically elongated, see Fig. 2, to permit said bracket to be vertically adjusted with respect to the lock plate 3. A coil spring 29, anchored to the inner portion of the lever 18 and a headed stud 30 on the bracket 26, tends to yieldingly hold the lever 18 in a position, as shown in Fig. 3, with its lock lug 22 out of engagement with the movable lock plate 4.

The inner end of the lever 18 is normally supported in an elevated position on an abutment 31, carried by a traveler 32, with its lock lug 22, overlapping the movable lock plate 4 and holding the same in an operative position. The traveler 32 is telescoped onto a tubular releasing bar 33, which in turn is slidably mounted in a pair of horizontally alined perforations in the bearing lugs 27 for endwise movement, transversely at the lever 18. An adjusting screw 34 on the traveler 32 is arranged to impinge against the releasing bar 33, for locking the carrier 32 thereto in different longitudinal adjustments thereon. The traveler 32 is held in an upright position by a rod 35 on which said traveler is slidably mounted. The guide rod 35 is mounted in horizontally alined perforations in the bearing lug 27, vertically below the releasing rod 33 and is rigidly secured thereto by a pair of opposing nuts 36, having screw threaded engagement with the projecting ends of said rod.

The abutment 31 is in the form of a yoke and its prongs embrace the expanded upper end portion of the carrier 32 and thereby holds said abutment against horizontal movement transversely of the lever 18. To prevent horizontal movement of the abutment 31, longitudinally of the lever 18, the prongs thereof are bifurcated to receive the web-like body of said carrier on either side of its expanded upper end portion. A clamping bolt 37 is provided for frictionally securing the abutment 31 to the carrier 32 in different vertical adjustment. The clamping bolt 37 is passed through the bifurcations in the prongs of the abutment 31 and through a horizontal perforation in the carrier 32 with its head and washer equipped end arranged to draw the abutment 31 onto the carrier 32.

All of the abutments 31 are simultaneously removed to release the levers 18; and hence, the links 10 of the tying devices, by a cable 38, preferably of twisted wire, pass axially through the releasing bars 33. Two-part clamping heads 39, located, one on each end of each releasing bar 33 are provided for axially securing said releasing bars 33 in different longitudinal adjustments on the cable 38. One member of each clamping head 39 is secured to the respective releasing bar 33, by screw threads and the members of each head are secured together and frictionally clamped onto the cable 38 by nut-equipped bolts 40, passed through perforated lugs on said members. The members of the clamping heads 39 are internally separated, see Fig. 9, to prevent their slipping on the cable 38.

One end of the cable 38 is extended through an aperture in the wall 1 of the barn structure and attached, by a clamping bar 41, to the intermediate portion of a hand lever 42, fulcrumed to a bracket 43, secured to said wall. The cable 38 also runs over a guide sheave 44, journaled in the bracket 43.

To prevent the parts of the releasing mechanism, located within the mangers, from being accidentally moved, casings 45 extend between adjacent brackets 26 and cover the end portions of the releasing bars 33 and exposed portions of the cable 38. Each bracket 26 is normally covered by a casing 46, hinged at 47 to the manger board 2, and held in a closed position by a spring latch 48 on said manger board, arranged to interlock with the beveled lock lug 49 on the casing 46. It is, of course, understood that the casings 45 and 46 may take various different forms.

The operation of the above described invention may be briefly described as follows:—

When the lever 42 is in a position, as indicated by dotted lines in Fig. 2, all of the abutments 31 are out of operative engagement with the lock levers 18, and the lock plates 4 are open, as shown to the left in Fig. 1. In securing the links 10 of the tying devices, to the manger, by the lock pin 15, it is necessary to start in the stall adjacent to the hand lever 42, as will presently appear. In attaching the link 10 to the lock pin 15, said link is first inserted through the slot 8 and the lock pin 15, then inserted through the said link. In closing plate 4, the lock pin 15 is carried therewith into the pin seat 9. When the lock plate 4 is closed, the inner end of the lever 18 is raised to carry its lock lug 22 into interlocking engagement with the lock plate 4. The carrier 32 is then moved away from the hand lever 42 to carry the abutment 31 under the raised inner end of the lock lever 18, to hold the same in an operative position. This movement of the carrier 32 will lift the lever 42 from its dotted line position to its full line position, as shown in Fig. 2. It will also provide sufficient slack in the cable 38 to allow the next abutment to move under the respective lock lever 18.

To release the tied animals, it is only necessary to move the lever 42 from its full line position to its dotted line position, as shown in Fig. 2. This movement of the lever 42 will draw all of the abutments 31, by means of the cable 38, from under the levers 18, thereby simultaneously releasing all of the lock plates 4. The releasing movement of the levers 18 will cause their kicker pins 23 to engage the lock plates 4 and impart thereto their initial opening movements. This initial opening movement of the lock plates 4 will carry the same beyond dead centers, so that their further opening movement will be under the action of gravity. During the opening movement of the lock plates 4 they will engage the shoulders, that is the rings 11 of the links 10, and positively move the links 10 out of engagement with the lock pins 15. By providing the lock pins 15 with pivoted heads and swiveling these heads to the lock plates 3, there is no danger whatsoever of the lock pins becoming stuck, during the releasing of the tying devices therefrom.

What I claim is:—

1. In a device of the kind described, the combination with a fixed lock plate and a movable lock plate connected by a hinge joint for folding movement, the latter onto the former, a lock device releasably connecting the movable lock plate to the fixed lock plate, and a lock pin for an animal tying device adapted to be held between said two plates, said movable lock plate having a passageway for the animal tying device.

2. In a device of the kind described, the combination with a fixed lock plate and a movable lock plate connected by a hinge joint for folding movement, the latter onto the former, and having co-incident passageways, of an animal tying device having a link insertible into said passage-ways, a lock pin insertible through the link of the tying device and arranged to be held between the lock plates, a lock lever for holding the movable lock plate folded onto the fixed lock plate, and means for operating the lock lever to release the movable lock plate.

3. In a device of the kind described, the combination with a fixed lock plate and a movable lock plate connected by a hinge joint for folding movement, the latter onto the former, and having co-incident passageways, of an animal tying device having a link insertible into said passage-ways, a lock pin insertible through the link of the tying device and arranged to be held between the lock plates, a lock lever for holding the movable lock plate folded onto the fixed lock plate, means for operating the lock lever to release the movable lock plate, and a kicker pin on the lock lever for imparting the initial movement to the movable lock plate.

4. In a device of the kind described, the combination with a fixed lock plate and a movable lock plate connected by a hinge joint for folding movement, the latter onto the former, and having co-incident passageways, of an animal tying device having a link insertible into said passage-ways, a lock pin having a pivoted head swiveled to the fixed lock plate, insertible through the link of the tying device and arranged to be held between the lock plates, a lock lever for holding the movable lock plate folded onto the fixed lock plate, and means for operating the lock lever to release the movable lock plate.

5. In a device of the kind described, the combination with a fixed lock plate and a movable lock plate connected by a hinge joint for folding movement, the latter onto the former, and having co-incident passageways, said fixed lock plate having a pin seat, of an animal tying device having a shoulder equipped link insertible into said passage-ways with its shoulder arranged to be engaged by the opening of the movable lock plate, a lock pin having a pivoted head swiveled to the fixed lock plate, insertible through the link of the tying device and arranged to be held in the pin seat by the movable lock plate, a lock lever for holding the movable lock plate folded onto a fixed lock plate, and means for operating the lock lever to release the movable lock plate.

6. In a device of the kind described, the combination with a fixed lock plate and a movable lock plate connected by a hinge joint for folding movement, the latter onto the former, and having co-incident passageways, said fixed lock plate having a pin seat, of an animal tying device having a shoulder equipped link insertible into said passage-ways with its shoulder arranged to be engaged by the opening movement of the movable lock plate, a lock pin having a pivoted head swiveled to the fixed lock plate, insertible through the link of the tying device and arranged to be held in the pin seat by the movable lock plate, a lock lever fulcrumed on the fixed lock plate for engagement with the movable lock plate to hold the same folded onto the fixed lock plate, a spring tending to hold the lock lever in a releasing position, a movable abutment engageable with the lock lever for holding the same in an operative position, and means for moving the abutment out of operative engagement with the lock lever.

7. In a device of the kind described, the combination with a tying device having a link, of a lock for holding the link including a pivoted lock lever, a spring tending to move the lock lever into a releasing position, a releasing bar mounted for movement transversely of the lock lever, an abutment on the releasing bar, normally holding the lock lever in an operative position, and means for moving the releasing bar to carry the abutment out of operative engagement with the lock lever.

8. In a device of the kind described, the combination with a plurality of tying devices each having a link, of a plurality of locks for independently holding the links of the tying devices, each of said locks including a pivoted lock lever, springs tending to move said lock levers into inoperative positions, releasing bars mounted for endwise movement transversely of the lock levers, an abutment on each of said releasing bars normally holding the respective lock lever in an operative position, flexible means connecting the releasing bars, and a lever connected to one of the end releasing bars for imparting simultaneously endwise movement to the releasing bars to carry the abutments out of operative engagement with the lock levers.

9. In a device of the kind described, the combination with a fixed plate, of a lock plate hinged to the fixed plate and having a slot, means for releasably holding the lock plate folded onto the fixed plate, a lock pin releasably held between the fixed plate and lock plate against both endwise and lateral movements and transversely of said slot, and an animal tying device extending through said slot and secured to the lock pin.

10. In a device of the kind described, the combination with a fixed plate, of a lock plate hinged at one edge to the fixed plate and having at its opposite edge portion a slot, a lock engageable with the slotted edge portion of the lock plate for holding the same folded onto the fixed plate, a lock pin releasably held between the fixed plate and lock plate against both endwise and lateral movements and transversely of said slot, and an animal tying device extending through said slot and secured to the lock pin.

In testimony whereof I affix my signature in presence of two witnesses.

CHARLI AXELSSON.

Witnesses:
W. F. ROCHE,
M. SORENSEN.

Copies of this patent may be obtained for five cents each, by addressing the "Commissioner of Patents, Washington, D. C."